(12) United States Patent
Meijer et al.

(10) Patent No.: US 6,931,081 B2
(45) Date of Patent: Aug. 16, 2005

(54) ANTENNA DIVERSITY RECEIVER

(75) Inventors: Pieter Meijer, Eindhoven (NL); Franco Toffolo, Eindhoven (NL); Christiaan Marie Hubertus Banziger, Roermond (NL)

(73) Assignee: Siemens VDO AG, Frankfurt (DE)

( * ) Notice: Subject to any disclaimer, the term of this patent is extended or adjusted under 35 U.S.C. 154(b) by 817 days.

(21) Appl. No.: 09/844,640

(22) Filed: Apr. 27, 2001

(65) Prior Publication Data

US 2001/0048401 A1 Dec. 6, 2001

(30) Foreign Application Priority Data

Apr. 28, 2000 (EP) .............................................. 00201527

(51) Int. Cl.[7] .......................... H04L 27/22; H03D 1/04; H04B 1/06
(52) U.S. Cl. ...................... 375/316; 375/346; 375/348; 455/277.2
(58) Field of Search ................................ 375/316, 346, 375/348, 147, 347; 455/277.2, 130, 205, 276.1, 133; 348/725

(56) References Cited

U.S. PATENT DOCUMENTS

| | | | | |
|---|---|---|---|---|
| 4,255,816 A | * | 3/1981 | Grunza et al. ............ | 455/277.1 |
| 4,397,041 A | * | 8/1983 | Takeda et al. ............ | 455/277.1 |
| 4,495,653 A | * | 1/1985 | Hamada .................... | 455/277.1 |
| 4,499,606 A | * | 2/1985 | Rambo ...................... | 455/277.2 |
| 4,525,869 A | * | 6/1985 | Hamada et al. ........... | 455/277.2 |
| 4,566,133 A | * | 1/1986 | Rambo ...................... | 455/277.2 |
| 4,726,073 A | * | 2/1988 | Sessink ..................... | 455/205 |
| 4,811,330 A | * | 3/1989 | Ohe et al. .................. | 455/272 |
| 4,821,042 A | * | 4/1989 | Ohe et al. .................. | 343/712 |
| 4,864,642 A | * | 9/1989 | Ueno et al. ............... | 455/277.2 |
| 4,878,252 A | * | 10/1989 | Sessink ..................... | 455/276.1 |
| 4,926,498 A | * | 5/1990 | Suzuki et al. ............. | 455/133 |
| 4,942,622 A | * | 7/1990 | Takayama et al. ........ | 455/277.2 |
| 4,977,615 A | * | 12/1990 | Suzuki et al. ............. | 455/277.2 |
| 5,201,072 A | * | 4/1993 | Kobayashi ................ | 455/277.1 |
| 5,263,190 A | * | 11/1993 | Taniguchi et al. ......... | 455/297 |
| 5,339,452 A | * | 8/1994 | Sugawara .................. | 455/212 |
| 5,379,449 A | * | 1/1995 | Porambo .................... | 455/506 |
| 5,548,836 A | * | 8/1996 | Taromaru ................... | 455/277.1 |
| 5,603,107 A | * | 2/1997 | Gottfried et al. ........... | 455/133 |
| 5,634,204 A | * | 5/1997 | Takahashi et al. ......... | 455/134 |
| 5,742,896 A |   | 4/1998 | Bose et al. ................. | 455/133 |
| 5,818,543 A | * | 10/1998 | Lee ............................ | 348/725 |
| 5,918,164 A | * | 6/1999 | Takahashi et al. ......... | 455/134 |
| 5,940,454 A | * | 8/1999 | McNicol et al. ............ | 375/347 |

FOREIGN PATENT DOCUMENTS

EP 0 274 157 A1 12/1987

* cited by examiner

*Primary Examiner*—Chieh M. Fan
*Assistant Examiner*—Jason M. Perilla
(74) *Attorney, Agent, or Firm*—Mayer, Brown, Rowe & Maw LLP.

(57) ABSTRACT

An antenna diversity receiver is disclosed. The diversity receiver has a multipath detector for controlling an antenna selective switching circuit. The switching circuit couples one of a plurality of antennas to a RF receiver input. The receiver allows suppression of adjacent channel interferences without unwanted side effects by employing a switching disabling circuit to automatically disabling the switching circuit when the signal delay between the occurrence of multipath distortions in the RF reception signal and the switching between antennas exceeds a predetermined critical signal delay value.

14 Claims, 1 Drawing Sheet

ANTENNA DIVERSITY RECEIVER

FIELD OF INVENTION

This invention relates to an antenna diversity receiver which has a selective switching circuit for coupling one of a plurality of antennas to a RF receiver input, as well as a multipath detector for controlling the selective switching circuit.

BACKGROUND OF INVENTION

The reception of a wanted RF broadcast transmitter signal may be disturbed or otherwise deteriorated by various phenomena, such as multipath reception and/or adjacent channel interferences. In general, multipath reception is caused by signal reflections at and/or against environmental physical obstacles such as mountains, trees, buildings, fences and the like. Due to such signal reflections a RF broadcast signal may arrive at a certain reception location through various different signal paths which result in different amplitude and phase conditions. The summation of these multipath signals at the antenna of the receiver results in unpredictable signal amplitude and/or phase distortions. These conditions often effectuate partial or complete cancellation of the useful RF reception signal. These signal cancellations, hereinafter also being referred to as signal dips, strongly depend on the RF carrier frequency of the received RF broadcasting signal and on the location of reception.

The signal dips severely deteriorate the wanted RF broadcasting signal and therefore also the overall signal reception quality. However, a relatively small shift in the antenna position may strongly improve signal reception quality. This solution is used in so-called antenna diversity receivers used with mobile FM receivers to avoid reception of multipath distorted RF signals. Such antenna diversity receivers are provided with two or more mutually spaced apart antennas coupled to a RF input of a receiver. Only the antenna having best local receiving conditions with respect to the other antenna(s) is actually connected to the RF receiver input. This antenna is hereinafter referred to as an actual antenna and is effective in the reception and supply of the wanted RF broadcasting signal to the receiver as long as the multipath distortion at the actual antenna remains smaller than a certain predetermined multipath threshold level. As soon as the received multipath distortion exceeds the predetermined multipath threshold level, a change of the RF signal supply to the receiver from the actual antenna to another antenna positioned at a location with better receiving conditions, is initiated. The receiver is thus continuously optimized for minimum multipath reception.

However, inherent to the antenna diversity feature are short interruptions in the RF signal supply to the receiver during the antenna change over or switching action. Due to the delay between the occurrence of an actual multipath caused signal dip and the detection thereof, the RF signal interruptions may be detected as being caused by multipath effects, and may initiate a subsequent false antenna switching action. The false antenna switching action may in its turn be detected as a multipath originated signal dip initiating a further false antenna switching action with an oscillating effect as a result. To reduce the risk of oscillating antenna switching actions, known antenna diversity receivers using Philips' TEA 6101 model antenna diversity integrated circuit are provided with means to disable any switching action following a preceding switching action within a certain predetermined fixed time period.

This known measure however, is not effective in receivers with dynamic IF selectivity, such as receivers with adjacent channel suppression. As mentioned above, adjacent channel interferences are another important source of signal distortion and are usually caused by FM radio broadcast signals modulated on a carrier positioned in frequency adjacent to the carrier frequency of a wanted FM radio broadcast signal. Due to peak values in the FM modulation signal, these adjacent channel FM radio signals may temporarily exceed the allocated channel bandwidth breaking through into the frequency range of the wanted FM radio broadcast signal. Adjacent channel suppression receivers suppress such adjacent channel interferences by varying the bandwidth of the variable bandwidth intermediate frequency (IF) selector circuits dependent on the deviation of the adjacent channel signal within the frequency range of the wanted FM radio broadcast signal. The larger the deviation, the smaller the bandwidth of the variable bandwidth intermediate frequency (IF) selector circuit. The dynamically varying IF selectivity thus effectuates a suppression of the adjacent channel interferences.

There is thus a need for a receiver which combines the benefits of the antenna diversity feature with those of the dynamic IF selectivity feature while preventing unwanted effects from occurring. There is a further need for an improved performance antenna diversity receiver.

SUMMARY OF THE INVENTION

These needs may be addressed by the present invention which is may be embodied in an antenna diversity receiver having antenna selective switching means for coupling one of a plurality of antennas to a RF receiver input, and a multipath detector for controlling the antenna selective switching means. The receiver is characterized by switching disabling means for automatically disabling the switching means when the signal delay between the occurrence of multipath distortion in the RF reception signal and the activation of the switching means exceeds a predetermined critical signal delay value. The present invention is based on the recognition that in an antenna diversity receiver the delay between the actual occurrence of a multipath caused signal dip and its detection is determined by the receiver's IF selectivity.

In a receiver with dynamic IF selectivity, the IF bandwidth is variable, therewith causing the delay to vary as well such that the smaller the IF bandwidth the longer the delay and vice versa. However, the longer the delay, the greater the risk of oscillating false antenna switching actions. By introducing the delay as a new parameter for disabling antenna switching actions in accordance with the invention, any antenna switching action is disabled when and for the time the delay exceeds the predetermined critical value. This allows for a combination of the features of antenna diversity and dynamic IF selectivity, while preventing antenna switching actions from oscillating.

Preferably, the antenna diversity receiver is characterized by an adjacent channel detector coupled to a bandwidth variable intermediate frequency (IF) circuit. The predetermined critical signal delay value defines a critical bandwidth for the bandwidth variable IF circuit. The switching means is automatically disabled when the bandwidth of the bandwidth variable IF circuit is smaller than the critical bandwidth. This measure is based on the above mentioned correspondence between the IF bandwidth and the delay between the actual occurrence of a multipath caused signal dip and the detection of it. The bandwidth of the bandwidth variable intermediate frequency (IF) circuit is accurately reflected in the output signal of the adjacent channel detector. This allows for a simple implementation of the invention.

A further preferred embodiment of the antenna diversity receiver is characterized by a threshold circuit coupled between an output of the adjacent channel detector and a control input of the switching disabling means. The threshold circuit compares the output signal of the adjacent channel detector with a threshold value corresponding to the critical bandwidth and supplies a switching disabling control signal to the switching disabling means when the output signal of the adjacent channel detector effectuates a bandwidth smaller than the critical bandwidth.

With a simple adjustment of the threshold voltage, the critical bandwidth can be set at a value preventing the antenna switching actions from oscillating and providing an effective adjacent channel suppression on the other hand. An antenna diversity receiver, which is provided with a fixed timer circuit introducing a fixed switching disabling period following each antenna switching action in accordance with the invention is preferably characterized by the bandwidth variable intermediate frequency (IF) circuit effecting a signal delay at the critical bandwidth corresponding to the fixed switching disabling period.

Such a fixed timer circuit is included in the Philips' TEA 6101 antenna diversity integrated circuit and may well be combined with the antenna switching disabling functionality initiated by the above switching disabling control signal. The use of the fixed switching disabling period as a reference for the determination of the critical bandwidth avoids the occurrence of antenna switching oscillations throughout the complete bandwidth control range of the bandwidth variable intermediate frequency (IF) circuit.

In practice the fixed switching disabling period following each antenna switching action in the Philips' IC TEA 6101 is 20 usec., defining the critical bandwidth to be substantially within the range between 40 and 50 Khz.

Another preferred embodiment of antenna diversity receiver provides for a simple combination of both the adjacent channel suppression feature with the antenna diversity feature is characterized in providing the adjacent channel detector with a multiplex input coupled to an output of the demodulator for detecting adjacent channel reception at the occurrence of both an amplitude variation in the IF signal level as well as distortion components in the demodulator output signal.

In yet another preferred embodiment, the plurality of antennas includes an antenna for receiving radio broadcast RF signals as well as an antenna for receiving telecommunication RF signals.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
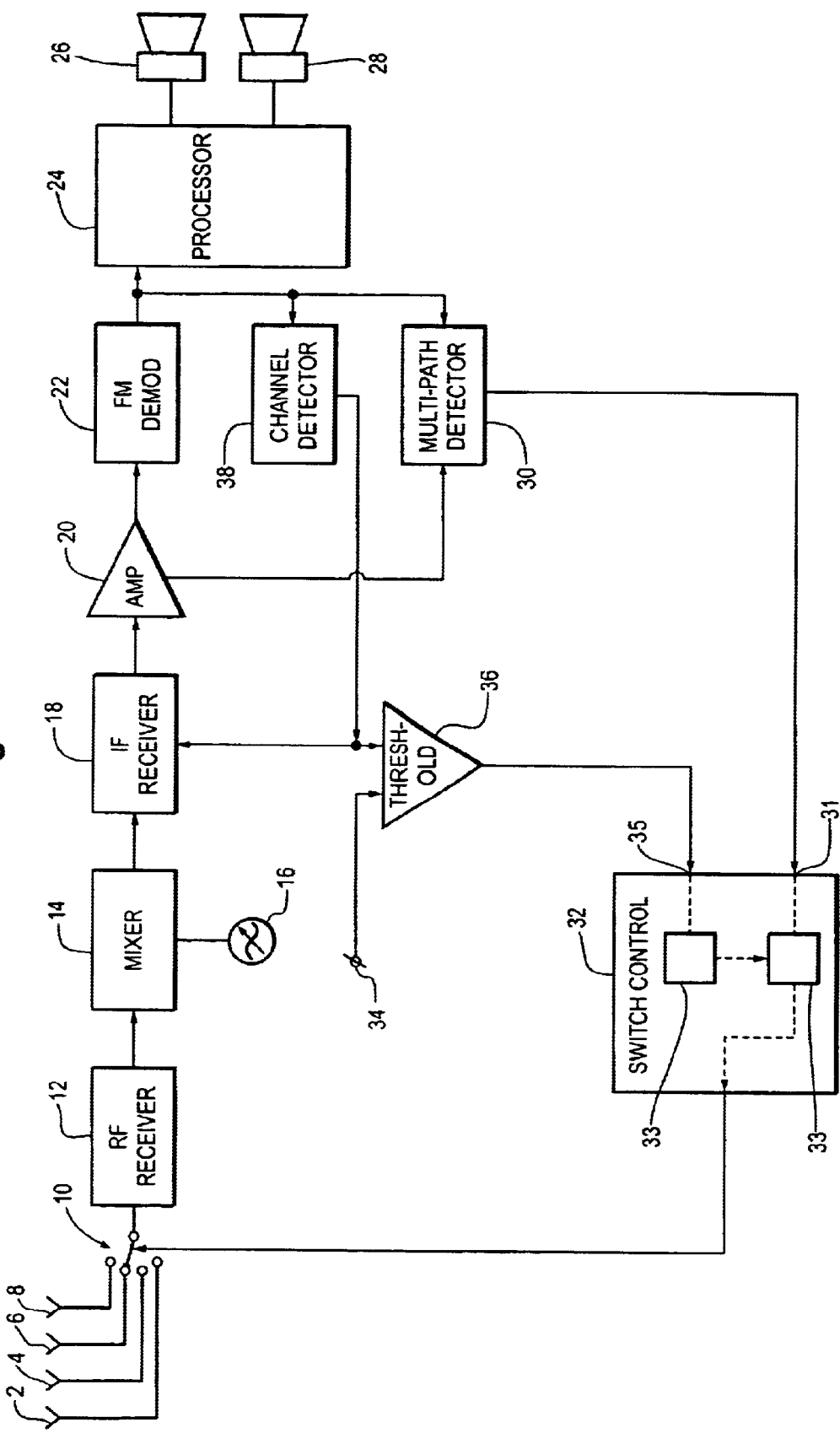
FIG. 1 shows an antenna diversity FM receiver according to one embodiment of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIG. 1 shows an antenna diversity FM receiver having first to fourth antennas 2, 4, 6 and 8 coupled through an antenna selective switching circuit 10 to a RF receiver input circuit 12. The RF receiver input circuit 12 is followed by a mixer device 14 which is supplied with a tunable local oscillator signal from an oscillator circuit 16, a variable bandwidth intermediate frequency (IF) selector circuit 18 (selective IF circuit), a IF amplifier 20, an FM demodulator 22 and a baseband modulation signal processor 24. The baseband modulation signal processor 24 is coupled to stereo left and stereo right signal reproducing circuits 26 and 28.

The signal processing in the antenna diversity receiver described so far is known. A RF broadcasting signal is received at one of the first through fourth antennas 2, 4, 6 and 8. In the embodiment shown, the third antenna 6 is the actual antenna. The third antenna 6 is supplied via the antenna selective switching circuit 10 and a RF receiver input terminal to the RF receiver input circuit 12 for broadband selection and amplification of the RF broadcasting signal. The output signal of the RF receiver input circuit 12 is then mixed in the mixer device 14 with the tunable local oscillator signal for a first demodulation of a wanted RF broadcast signal into an intermediate frequency (IF) signal. This IF signal is filtered in the selective IF circuit 18, subsequently amplified by the IF amplifier 20 and demodulated by the FM demodulator 22 into a baseband modulation signal which is a stereo multiplex (MPX) signal. The MPX signal is further processed in the processor 24 to obtain stereo left and stereo right signals to be converted into acoustic signals in the stereo left and stereo right signal reproducing circuits 26 and 28.

The antenna diversity receiver also includes a multipath detector 30 for detecting multipath distortion in the received RF signal. The detection of multipath distortion is based on two criteria: the occurrence of a (fast) amplitude dip in the level of the IF signal and the occurrence of distortion components occurring within the frequency range of the baseband modulation signal above the frequency spectrum of the MPX signal. The first and second input terminals of the multipath detector 30 are therefore coupled respectively to an output of the selective IF circuit 18 and to an output of the FM demodulator 22. If a IF signal dip is detected to occur simultaneously with distortion components within the frequency range of the baseband modulation signal, then the multipath detector 30 supplies a switching control signal to a switching control signal input terminal 31 of an antenna switching control device 32. This causes the antenna selective switching circuit 10 to change over reception from the antenna 6 which is the actual antenna up to this switching action, to another antenna, having better receiving conditions than the antenna 6. In this example, the antenna 8 is selected (the connection to the RF receiver input circuit 12 is not shown).

The next multipath caused signal dip detected will initiate a subsequent antenna switching action as described above. In receivers using Philips' TEA 6101 antenna diversity integrated circuit the antenna switching control device 32 has a disabling circuit 33 which prevents any antenna switching action from being followed by a subsequent antenna switching action within a fixed time period of 20 usec. These time periods are referred to as fixed switching immunity periods. The antenna switching disabling circuit 33 has a timer circuit (not shown) using a counter, which is set to start counting monotonously up or down at the occurrence of each switching control signal and stops counting after the fixed time period of 20 usec. This provides immunity from switching control signals during counting and prevents switching actions during these fixed switching immunity periods from occurring.

The antenna diversity receiver is provided with an adjacent channel detector 38 functioning as bandwidth control which has an input coupled to an output of the FM demodulator 22. The channel detector 38 also has an output coupled to a bandwidth control input of the selective IF circuit 18. This output varies the bandwidth dependent on adjacent channel interferences, such that the bandwidth of the selective IF circuit 18 is smaller, the more the adjacent channel signal is overlapping or trespassing the frequency area of the wanted RF signal. The interferences caused by such adjacent channel signals are thereby reduced. For a more detailed description of the functioning of the adjacent channel feature in suppressing adjacent channel interferences, reference is made to U.S. Pat. No. 4,907,293 hereby incorporated by reference.

In addition to the fixed switching immunity periods the receiver is also provided with an immunity for switching control signals from the multipath detector 30 when and for the time, the bandwidth of the selective IF circuit 18 is smaller than a certain critical bandwidth value. To avoid switching actions from oscillating at any bandwidth of the selective IF circuit 18 within its entire bandwidth variation range, the length of the fixed switching immunity periods following each antenna switching action provided by the timer circuit is used to determine the critical bandwidth value, such that the bandwidth variable intermediate frequency (IF) circuit will effect a signal delay at the critical bandwidth corresponding to the fixed switching disabling period. At a length of the fixed switching immunity periods of 20 usec. the critical bandwidth value, which is referred to as the predetermined threshold value of the IF selectivity bandwidth, will be substantially within the range between 40 and 50 KHz.

Therefore the receiver has a threshold circuit 36 coupled between an output of the adjacent channel detector 38 and a control input 35 of the antenna switching disabling circuit 33 for comparing the output signal of the adjacent channel detector 38 with a threshold value corresponding to the critical bandwidth value and for supplying a switching disabling control signal to the antenna switching disabling circuit 33, when the output signal of the adjacent channel detector 38 effectuates a bandwidth smaller than the critical bandwidth value. The threshold value is set with a well chosen predetermined threshold voltage Vth supplied from a threshold voltage input terminal 34 to the threshold circuit 36.

It will be apparent to those skilled in the art that various modifications and variations can be made in the method and system of the present invention without departing from the spirit or scope of the invention. For example, the plurality of antennas may include an antenna for receiving radio broadcast RF signals as well as an antenna for receiving telecommunication RF signals. The present invention is not limited by the foregoing descriptions but is intended to cover all modifications and variations that come within the scope of the spirit of the invention and the claims that follow.

What is claimed is:

1. An antenna diversity receiver comprising:
   an antenna selective switching means for coupling one of a plurality of antennas to a RF receiver input; and
   a multipath detector for controlling said antenna selective switching means including a switching disabling means for automatically disabling said antenna selective switching means when a signal delay effected by a bandwidth variable intermediate frequency (IF) circuit between an occurrence of multipath distortion in a RF reception signal received by the antenna diversity receiver and the activation of said antenna selective switching means for coupling one of the plurality of antennas to the RF receiver input exceeds a predetermined critical signal delay value.

2. The antenna diversity receiver according to claim 1, wherein an adjacent channel detector is coupled to the bandwidth variable intermediate frequency circuit said predetermined critical signal delay value defining a critical bandwidth for said bandwidth variable IF circuit, said antenna selective switching means being automatically disabled when a bandwidth of said bandwidth variable IF circuit is smaller than said critical bandwidth.

3. The antenna diversity receiver according to claim 2, further comprising a threshold circuit coupled between an output of the adjacent channel detector and a control input of the switching disabling means for comparing the output signal of the adjacent channel detector with a threshold bandwidth value corresponding to said critical bandwidth and for supplying a switching disabling control signal to the switching disabling means when said output signal of the adjacent channel detector effectuates a bandwidth smaller than said threshold bandwidth value.

4. The antenna diversity receiver according to claim 2, which is provide with a fixed timer circuit introducing a fixed switching disabling period following each antenna switching action wherein the bandwidth variable intermediate frequency (IF) circuit effects a signal delay at said critical bandwidth corresponding to said fixed switching disabling period.

5. The antenna diversity receiver according to claim 3 wherein said threshold bandwidth value of the IF selectivity bandwidth is substantially within the range between 40 and 50 KHz.

6. The antenna diversity receiver according to claim 2 wherein the adjacent channel detector is provided with a multiplex input coupled to an output of a demodulator for detecting adjacent channel reception at the occurrence of both an amplitude variation in the IF signal level and distortion components in the demodulator output signal.

7. An antenna diversity receiver according to claim 1 wherein the plurality of antennas includes an antenna for receiving radio broadcast RF signals and an antenna for receiving telecommunication RF signals.

8. An antenna diversity receiver which detects a RF reception signal comprising:
   a RF receiver with an input;
   an antenna selective switching circuit which couples one of a plurality of antennas to the input of the RF receiver; and
   a multipath detector coupled to the antenna selective switching circuit, the detector including a switching disabling circuit which automatically disables the switching circuit when a signal delay effected by a bandwidth variable intermediate frequency (IF) circuit between an occurrence of a multipath signal in the RF reception signal and the activation of the antenna selective switching circuit for coupling one of the plurality of antennas to the input of the RF receiver exceeds a predetermined critical signal delay value.

9. The antenna diversity receiver according to claim 8 further comprising:

an adjacent channel detector;

the bandwidth variable intermediate frequency circuit coupled to the adjacent channel detector wherein the predetermined critical signal delay value defines a critical bandwidth for the bandwidth variable IF circuit, and wherein the switching circuit is automatically disabled when the bandwidth of the bandwidth variable IF circuit is smaller than the critical bandwidth.

10. The antenna diversity receiver according to claim 9, further comprising a threshold circuit coupled between an output of the adjacent channel detector and a control input of the switching disabling circuit for comparing the output signal of the adjacent channel detector with a threshold bandwidth value corresponding to the critical bandwidth, wherein the threshold circuit supplies a switching disabling control signal to the switching disabling circuit when the output signal of the adjacent channel detector effectuates a bandwidth smaller than the threshold bandwidth value.

11. The antenna diversity receiver according to claim 9, further comprising a fixed timer circuit introducing a fixed switching disabling period following each antenna switching action wherein the bandwidth variable intermediate frequency (IF) circuit effects a signal delay at the critical bandwidth corresponding to the fixed switching disabling period.

12. The antenna diversity receiver according to claim 10 wherein the threshold bandwidth value of the IF selectivity bandwidth is substantially within the range between 40 and 50 KHz.

13. The antenna diversity receiver according to claim 9 wherein the adjacent channel detector includes a multiplex input coupled to an output of a demodulator for detecting adjacent channel reception at the occurrence of both an amplitude variation in the IF signal level and distortion components in the demodulator output signal.

14. An antenna diversity receiver according to claim 8 wherein the plurality of antennas includes an antenna for receiving radio broadcast RE signals and an antenna for receiving telecommunication RF signals.

* * * * *